(12) United States Patent
Battle

(10) Patent No.: US 7,210,425 B1
(45) Date of Patent: May 1, 2007

(54) MOLDED FISH TRANSPORT TANK

(76) Inventor: Bill Battle, 5475 Hwy. 4, Tunica, MS (US) 38676

( * ) Notice: Subject to any disclaimer, the term of this patent is extended or adjusted under 35 U.S.C. 154(b) by 0 days.

(21) Appl. No.: 11/404,548

(22) Filed: Apr. 14, 2006

(51) Int. Cl.
*A01K 63/02* (2006.01)
(52) U.S. Cl. .................. 119/203; 119/214; 119/226
(58) Field of Classification Search ........... 119/201, 119/202, 203, 207, 209, 211, 214, 215, 224, 119/225, 226, 228, 245, 246, 248, 263; 43/54.1, 43/55, 56, 57; 285/136.1, 206
See application file for complete search history.

(56) References Cited

U.S. PATENT DOCUMENTS

| | | | |
|---|---|---|---|
| 3,401,671 A | 9/1968 | Axelrod et al. ............ 119/5 |
| 3,687,111 A | 8/1972 | Epper .................... 119/2 |
| 4,815,411 A | 3/1989 | Burgess ................. 114/255 |
| 5,572,952 A | 11/1996 | Manome ................. 119/203 |
| 5,606,935 A | 3/1997 | Hanrahan ............... 119/203 |
| 6,557,492 B1 | 5/2003 | Robohm ................. 119/203 |

*Primary Examiner*—T. Nguyen
(74) *Attorney, Agent, or Firm*—Charles D. Gunter, Jr.

(57) ABSTRACT

A transport tank for use in live haul truck transport of aquatic species such as catfish is formed of rotomolded plastic. The tank has a grooved floor which is covered with a perforated plate. The grooves contain aeration lines which run along the length of the floor. The aeration lines have threaded end fittings which engage a doubly threaded nut which is received in a sidewall opening of the tank. The hoses can be removed for servicing by simply unthreading the doubly threaded nut and pulling the aeration lines out of the sidewall openings.

6 Claims, 3 Drawing Sheets

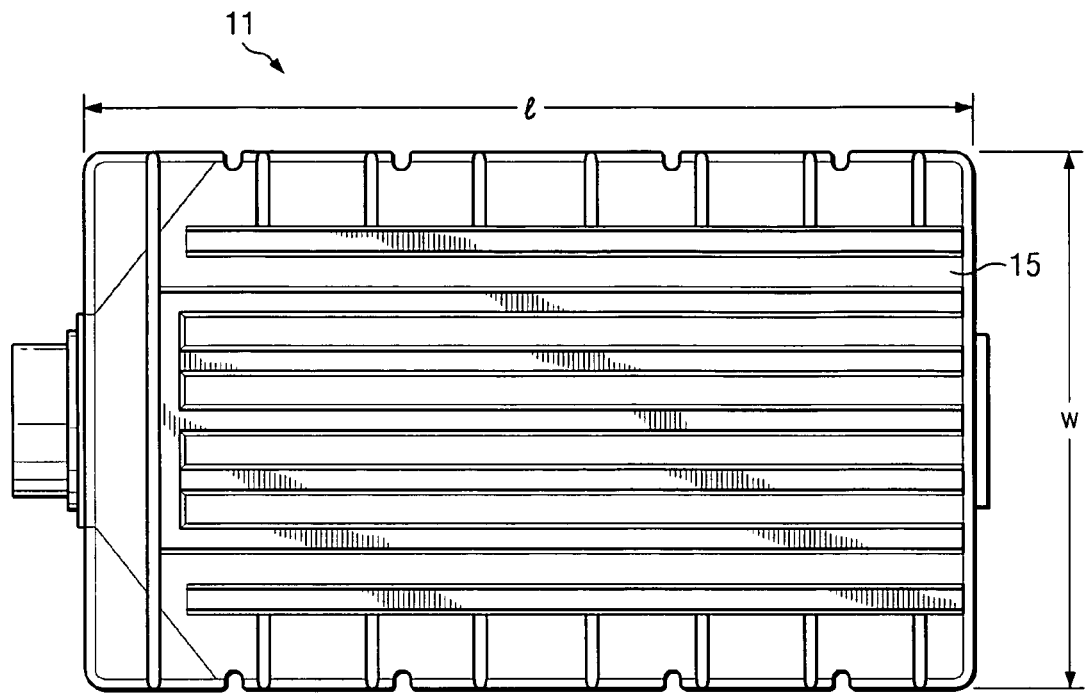
FIG. 3
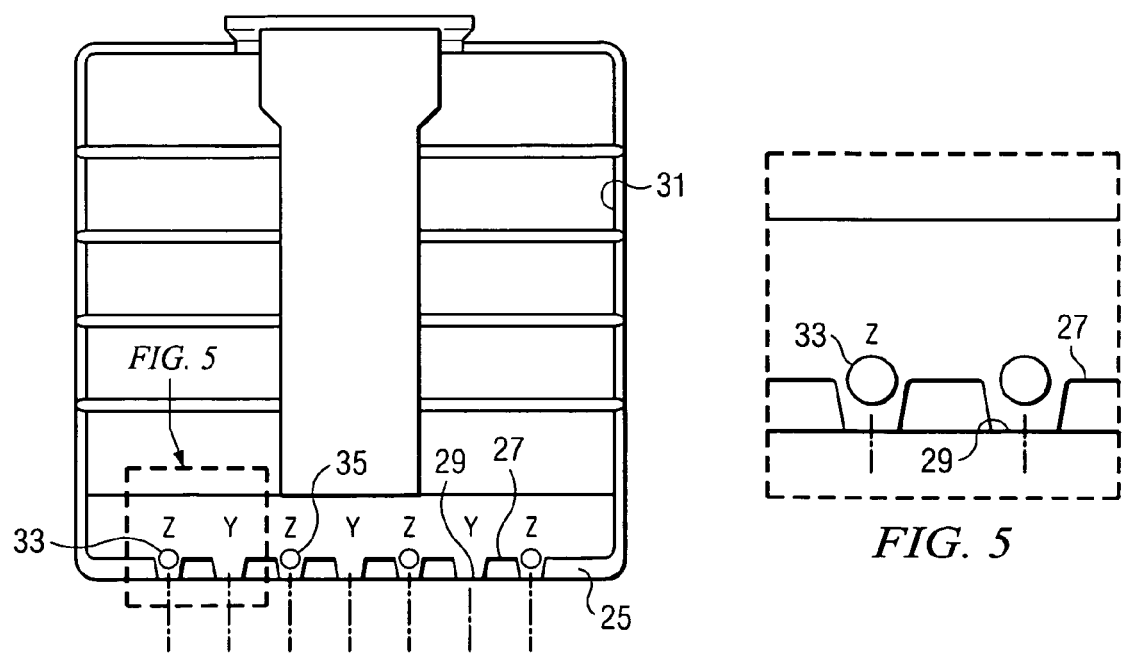
FIG. 5
FIG. 4

MOLDED FISH TRANSPORT TANK

BACKGROUND OF THE INVENTION

1. Field of the Invention

The present invention relates generally to a device and method for transporting live finned fish, and more specifically to an improved truck mounted transport tank for transporting live catfish. While a primary market for the invention is live catfish transport, it can also easily be adapted for the transport of other aquatic species such as crabs, oysters, lobsters, shrimp, and the like.

2. Description of the Prior Art

As will be familiar to those skilled in the relevant industry, live fish in the United States have traditionally been transported over-the-road by "live haul" trucks. These are typically flatbed trucks that have been significantly modified to carry fish. Typical modifications include the permanent installation of one or more insulated fixed tanks or boxes in the flatbed. These tanks typically have hinged lids on the top and one or more circular or rectangular release gates on side of the tanks for simultaneously discharging water and fish. The earlier mechanical aerators using small motors and propellers have more recently given way to liquid oxygen tanks, manifolds carrying the gaseous oxygen to oxygen flow meters, and subsequently to aeration bubblers located in the bottoms of the tanks.

The standard live haul truck may be used for live bait hauling or fingerling stocking as well as for transporting live food fish. Due to the variety and types of loads, pickup and discharge locations, the configuration of these live haul trucks is far from standardized. Rather, the live haul truck is often a highly specialized, dedicated piece of equipment which is not intended for alternative uses. In ordinary practice, the fish are loaded dry (i.e., in nets without water), directly from the tanks and/or ponds of the fish farm into the integral fish tanks of the live haul truck.

Traditional live haul trucks which are commercially available in the industry include such companies as Seaplast PLC (Dalvik, Iceland), Seaplast Canada Ltd. (New Brunswick, Canada) and Peterson Fiberglass Laminates, Inc (Shell Lake, Wis.). These insulated tanks may be manufactured from a number of different materials including fiberglass, plastic, wood, and metal.

Just as in the case of fixed culture environments, such as containment ponds, tanks and aquariums, the transport tanks used on live haul trucks typically need an aeration system to supply sufficient oxygen to the aquatic livestock. Without an aeration apparatus in the aquatic environment, the livestock may die due to lack of oxygen. In addition to supplying oxygen, the aeration apparatus typically provides the additional advantage of achieving agitation of the bottom layers of the water to help prevent stagnation of the bottom portion of the aquatic environment. Agitation of the bottom of the aquatic environment also stirs up and redistributes the nutrients or food that have sunk to the bottom. The aquatic environment also requires a controlled circulation to prevent stagnant corners or regions.

One problem that exists at the present time is that the prior art tanks have tended to place the aeration lines on the bottom floor of the tank interior. The fins of the fish often damage the aeration lines, presenting a maintenance problem. In the case of routine maintenance, or an emergency situation, it was generally necessary to remove the fish and drain the tank in order to allow a worker to climb down into the interior of the tank to access the lines. In this regard, there is an obvious need to limit the handling, netting, moving by pump, draining via chutes, and otherwise touching of the live fish that would be required during such maintenance operations. Any time the fish are handled and moved, there is the chance of injury. Even careful handling of the fish can result in fungus and other type skin infections which are injurious to the fish.

Various aeration systems have been used in truck transport and other type systems in the past. For example, U.S. Pat. No. 6,557,492, shows a live fish transport system in the form of insulated tanks which can be used with live haul trucks. The tanks are made of polyethylene and may include "fork liftable" footed bases. As explained beginning at Col. 11, line 1, et seq., anchors 275 are adhered to the interior surface of the tank which serve as brackets for mounting the oxygen diffusers in position.

U.S. Pat. No. 3,401,671 shows a fish shipping container formed of an insulating material such as Styrofoam™. The bottom wall is provided with a grid 18 made up of lands 20 and channels 22. The channels provide air circulation to prevent conduction of heat from the container to floor of the freight compartment but are not used to house aeration conduits.

U.S. Pat. No. 5,606,935, shows a transportable fish tank including a mounting frame or base 120 and longitudinal base frame members 121. In one aspect of the disclosure, longitudinal recesses 48 are provided for inlet conduits, suction conduits and skimmer conduits (Col. 8, lines 12–14). These conduits are indicated as "I", "SU", and "SK" in FIGS. 2, 9 and 10. These exterior conduits are apparently connected to such devices as the skimmer assembly (65 in FIG. 6). The lower tube 67 passes upwardly through the tank wall and may be sealed with a sealing ring or gasket.

None of these prior art systems address the problem of making the aeration lines easily accessible from the tank exterior for routine maintenance type operations.

Therefore, there remains a need for an apparatus that adequately aerates the tank of a long haul truck which is easy to access for maintenance purposes.

There is also a need for such a device having an aeration apparatus which is located in a protected fashion relative to the live fish in the tank, so that the fins of the fish do not come into contact with the aeration lines themselves.

There is also a need for an improved method for maintaining oxygenation, providing bottom agitation and controlling circulation to an environment for aquatic livestock, such as a catfish transport truck.

SUMMARY OF THE INVENTION

The present invention accordingly has as its advantage to eliminate certain disadvantages and drawbacks associated with the current transport tanks used in live haul systems. The present invention attempts to address these problems, to remove the limitations and reduce the overall maintenance costs associated with live transport of commercial quantities of food fish.

The transport tank of the invention comprises a tank body formed of molded plastic, the tank having a top, a bottom, opposing sidewalls, a length, a width, and an interior floor, the interior floor being formed with alternating ribs and grooves running longitudinally parallel to the length thereof. A plurality of aeration lines run along at least a part of the length of at least selected ones of the grooves in the interior floor. A perforated floor plate is located atop the interior floor, the plate being arranged to cover at least that portion of the interior floor containing aeration lines within the alternating grooves. Each aeration line has an externally threaded end fitting. Each of the aeration lines is connected to a sidewall opening of the tank body by means of a double threaded nut having inner and outer threaded surfaces. The outer threaded surface is threadedly engaged within mating threads provided in the sidewall opening. The inner threaded surface matingly engages the externally threaded surface of the aeration line end fitting. The aeration line can easily be removed from the tank groove by unthreading the double threaded nut from outside the tank and by then pulling the aeration line longitudinally out of the tank groove. The aeration line can be conveniently manufactured from soaker hose of the type commonly sold in home supply stores.

The preferred tank body is rotomolded as a single piece. In the preferred method of maintaining aquatic life within the transport tank, the aeration lines running along at least a part of the length of at least selected ones of the grooves in the interior floor are connected to both a source of pure oxygen and to a blower fan source. This gives the operator the choice of either source of oxygen for the aquatic life being transported. Because the tank body is rotomolded of plastic, it can be provided with a number of convenient features, such as an anti-skid top surface and external strap depressions for receiving carrying or transport straps.

Additional objects, features and advantages will be apparent in the written description which follows.

BRIEF DESCRIPTION OF THE DRAWINGS

FIG. 3 is a plan view of the bottom the fish transport tank of the invention showing the grooved surfaces thereof.

FIG. 4 is a rear end view of the tank of FIG. 1 showing the placement of the aeration lines in the bottom of the tank.

FIG. 5 is a close-up, isolated view of a portion of the floor of the tank, showing one of the aeration lines in detail.

DETAILED DESCRIPTION OF THE INVENTION

The transport system of the invention is used to transport aquatic life, preferably finned fish. However, as will be appreciated by those skilled in the art, the term "fish" can be interpreted broadly to encompass not only animals taxonomically classified as such (e.g., fin fish) but also "fishery products" including, for example, a wide variety of saltwater and freshwater fish species as well as crustaceans, shellfish, and other species exhibiting similar life-support requirements.

As used herein, the term "transport tank" refers to a molded container specially adapted for harvesting, storing and transporting live fish. The transport tanks of the present invention have generally rectangular or square cross-section, although other shapes are within the scope of the invention. The transport tanks of the present invention are preferably made from lightweight, durable, synthetic plastic, such as a medium-density polyethylene resin. However, other materials such as fiberglass and other plastics are contemplated by the invention.

The main components of the transport tanks of the invention are preferably molded as single pieces, for instance, by rotational molding, vacuum forming, blow molding, or injection molding. Preferably, the tanks are rotationally molded from synthetic materials. Rotational molding is a manufacturing technique which will be familiar to those skilled in the relevant arts. Basically, in rotational molding, the product is formed inside a closed mold or cavity where the mold is rotated by biaxially in a heating chamber. To obtain the mold rotation in two planes perpendicular to each other, a spindle is rotated on a primary axis, while the mold is rotated on a secondary axis. In the loading stage, either liquid or powdered plastic is charged into a hollow mold. The mold halves are then clamped shut and then moved into an oven where the loaded mold spins biaxially.

In the oven, heat penetrates the mold causing the plastic, if it is in the powder form, to become tacky and stick to the mold surface, or if it is in the liquid form, to start to gel. Usually, the heating is done by air or liquid or high specific heat, such as molting salt. Since the mold continues to rotate while the heating is going on, the plastic will gradually become distributed evenly on the mold cavity walls through gravitational force. As the cycle continues, the synthetic material melts completely and forms a homogeneous layer of molten plastic.

When the parts have been formed, the mold is moved to a cooling chamber where cooling is accomplished by either a cold spray of water and/or forced air or liquid circulation inside the mold. The mold continues to be rotated during the cooling cycle. Additional details on rotational molding can be found in the *Plastic Engineering Handbook of the Society of Plastics, Inc.*, 4$^{th}$ Ed. J. Frados, Nostrand-Reinhold Publishers, and similar references.

Figure 1:
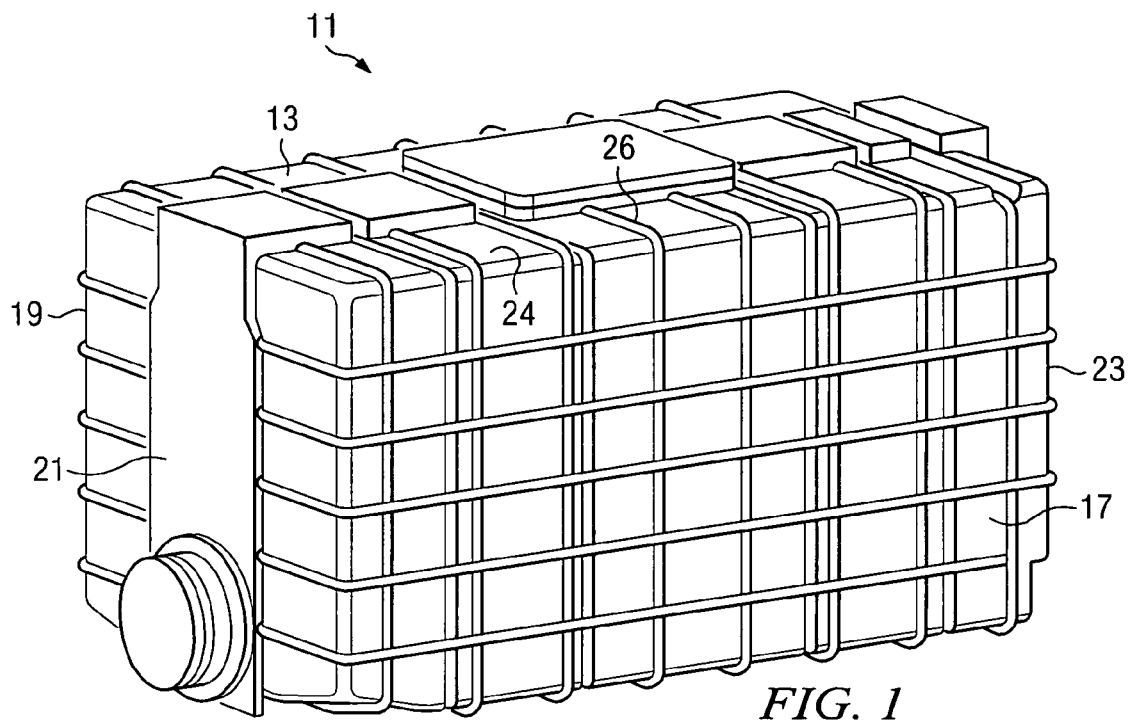
FIG. 1 is a side perspective view of a transport tank of the invention showing the front discharge port thereof.
Figure 2:
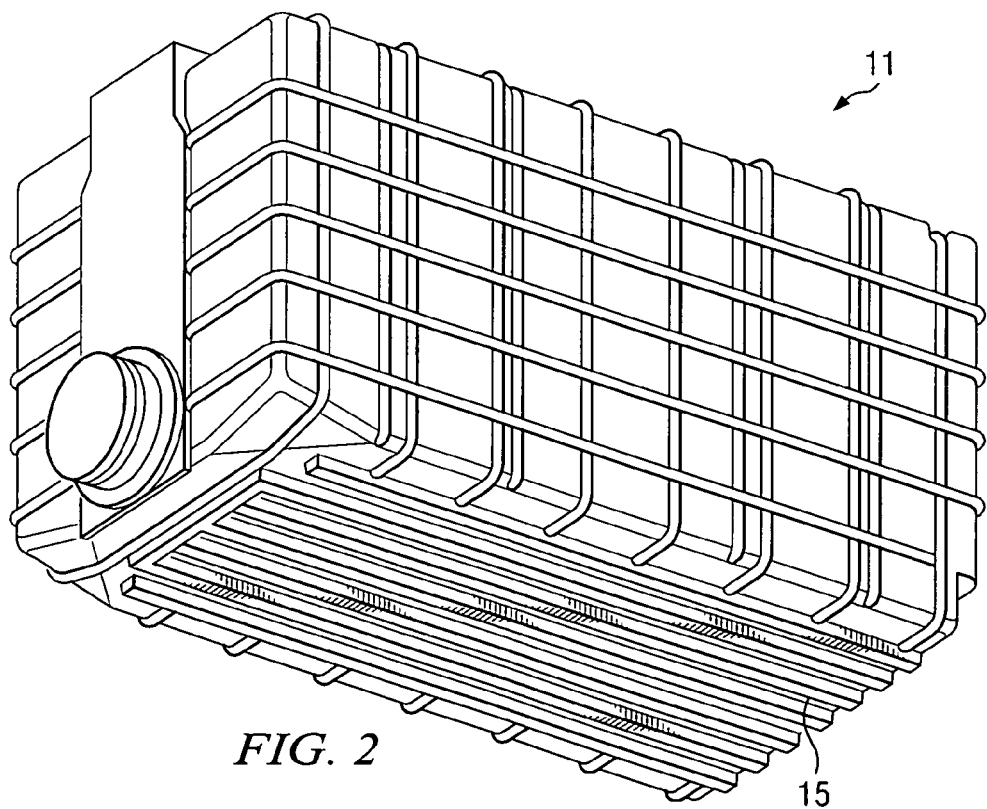
FIG. 2 is a perspective view of the tank of FIG. 1, but showing the bottom surface thereof.

Turning to FIGS. 1 and 2, there is shown a transport tank 11 for live haul transport of aquatic life. The tank body 11 has a top 13, a bottom 15, opposing sidewalls 17, 19, 21, 23, a length "1", a width "w" and an interior floor (25 in FIG. 4). As best seen FIGS. 4 and 5, the interior floor 25 is molded with alternating ribs and grooves 27, 29 running longitudinally parallel to the length "1" thereof. The alternating ribs and grooves are formed as apart of the plastic rotomolding process. The use of a rotomolding process also makes it convenient to provide an anti-skid surface (24 in FIG. 1) to the top surface 13 as well as external strap depressions 26 for receiving transport straps.

An aeration system is incorporated into the floor of the tank and is exposed from the tank interior 31. In the example illustrated, a plurality of aeration lines, such as lines 33 and 35 in FIG. 4, run along at least a part of the length of at least selected ones of the grooves 29 in the interior floor 25. The aeration lines could conceivably be any of a number of types of elongate conduits having apertures along the length thereof or being formed of a suitable porous material. The preferred aeration lines 33, 35 are commercially available "soaker hose" lines of the type available at home supply stores used for home gardening purposes.

Soaker hoses are typically made of synthetic materials, such as polyethylene, old recycled car tires, and the like, and have tiny weep holes which make them porous in nature. As used in gardening applications, the hoses lie directly on the ground, are tucked beneath a layer of mulch, or are located below ground so water can slowly seep into the roots of the plants, bushes, shrubbery and vegetable gardens. They supply water at a steady, slow rate, which keeps the soil moist.

When they are immersed in water, as in the present application, the porous nature of the material allows oxygen to bubble upwardly and aerate the tank water.

Figures 7A, 7B:
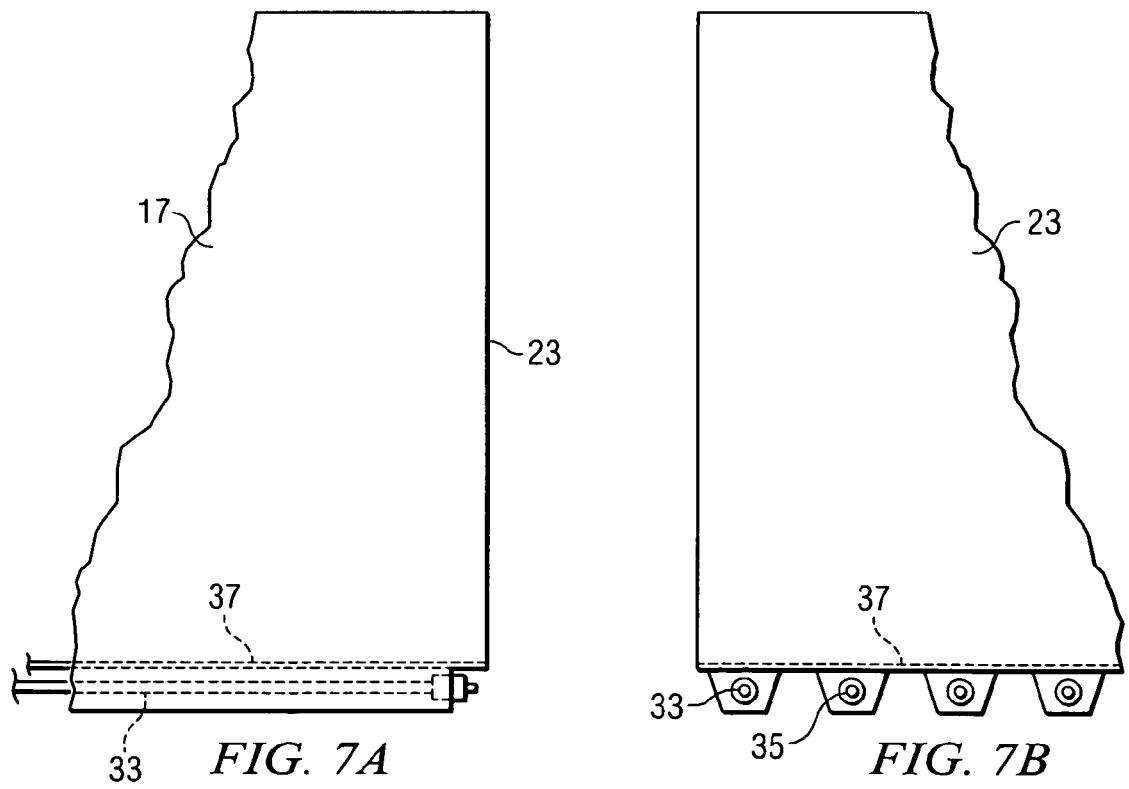
FIG. 7A is an isolated view of a portion of the tank sidewall, showing the placement of an aeration hose.
FIG. 7B is an isolated end view of a portion of the tank sidewall showing the aeration conduits.

In order to prevent finned fish from contacting and damaging the porous aeration lines 33, 35, a perforated floor plate (37 in FIG. 7A) is located atop the interior floor 25. The plate 37 is arranged to cover at least that portion of the interior floor 25 which contains the aeration lines within the alternating grooves 29. Preferably, the entire floor area is substantially covered by the perforated floor plate 37. The floor plate could be formed of any convenient material, including aluminum or other metals, but cannot also be a suitably injection molded from a suitable plastic.

Preferably, the aeration lines which run along at least a part of the length of the grooves 29 are connected to both a source of pure oxygen and to a blower fan source. The system may utilize any of a number of commercially available oxygen delivery systems. Such systems typically include an oxygen flow meter having a supply coupling for fluidly connecting the flow meter to an oxygen supply line and a delivery coupling for fluidly connecting the flow meter to an oxygen delivery line. As has been explained, the soaker hose (aeration lines 33, 35) act as an oxygen diffusing system to direct oxygen upwardly from the floor of the tank 11.

In the industry at the present time, electric agitators or air blowers are commonly used to enhance carbon dioxide removal and aerate live fish transport tanks. While these devices are practical and readily available, they can have some disadvantages: high initial investment, possible equipment or power failure, and they may cause water temperature to rise more rapidly during transport. Recently, the use of pure oxygen gas for fish transport has become more commonplace. In some instances, there can be advantages to the use of pure oxygen, including the fact that there is little chance of equipment failure; it may reduce water temperature slightly; water turbulence is limited; and loading rates can generally be increased.

In order to further explain the general environment of the invention, pure oxygen flow rates used for live transport generally range from about 3–6 liters/minute of oxygen gas for each 100 gallons of fish transport water. Actual flow rates will vary from load to load and must be adjusted accordingly. Oxygen is introduced into the water as very fine bubbles through the porous material of the soaker hose. Dissolved oxygen levels are dependent on bubble size; smaller bubbles produce higher levels. Because water agitation is minimal with pure oxygen injection, carbon dioxide tends to accumulate; reducing oxygen availability to fish during long trips if water is not exchanged. Alternatively, some type of mechanical agitator may be utilized. If accumulation is slow and oxygen levels are adequate, channel catfish will tolerate on the order of 20–30 mg/l of carbon dioxide. Thus, a 160 liter (42 gallon or 5.6 cubic foot) liquid oxygen container will supply approximately 127,000 liters of oxygen gas. That amount would supply, for example, at 3 liters/min, 100 gallon–1,000 gallons of transport water for about 70.5 hours. Compressed oxygen gas is available in steel cylinders which are commonly used for welding and are available in a number of sizes. Oxygen concentrations can be adjusted up or down by increasing or decreasing gas flow rates with the standard regulator valve/gauge and a flow meter. Oxygen levels below the minimum recommendation may stress or suffocate fish. Levels above the maximum recommendation could cause gas bubble disease or tissue damage. Standard catfish loading rate recommendations are made for transport water at 65° F. Loading rates must be reduced approximately 25% for every 10° increase above 65° F.

The features of the present aeration system may be utilized with either a pure oxygen system of the type described above, or with a mechanical blower type system. The above discussion is merely intended to describe the general background of a live haul operation, in the case described using a pure oxygen source for the aeration.

As mentioned in the background discussion, a problem has existed in performing routine maintenance type operations on live haul tanks. More specifically, the location and mounting of the aeration lines has proved to be problematical. In the prior art systems, it was generally necessary for a worker to enter the tank interior in order to access the aeration lines 33, 35. This required draining the tank and removing the stock of live fish. The present invention provides improved access to the aeration lines 33, 35 from the tank exterior so that it is not necessary for a worker to enter the tank interior 31.

Figure 6:
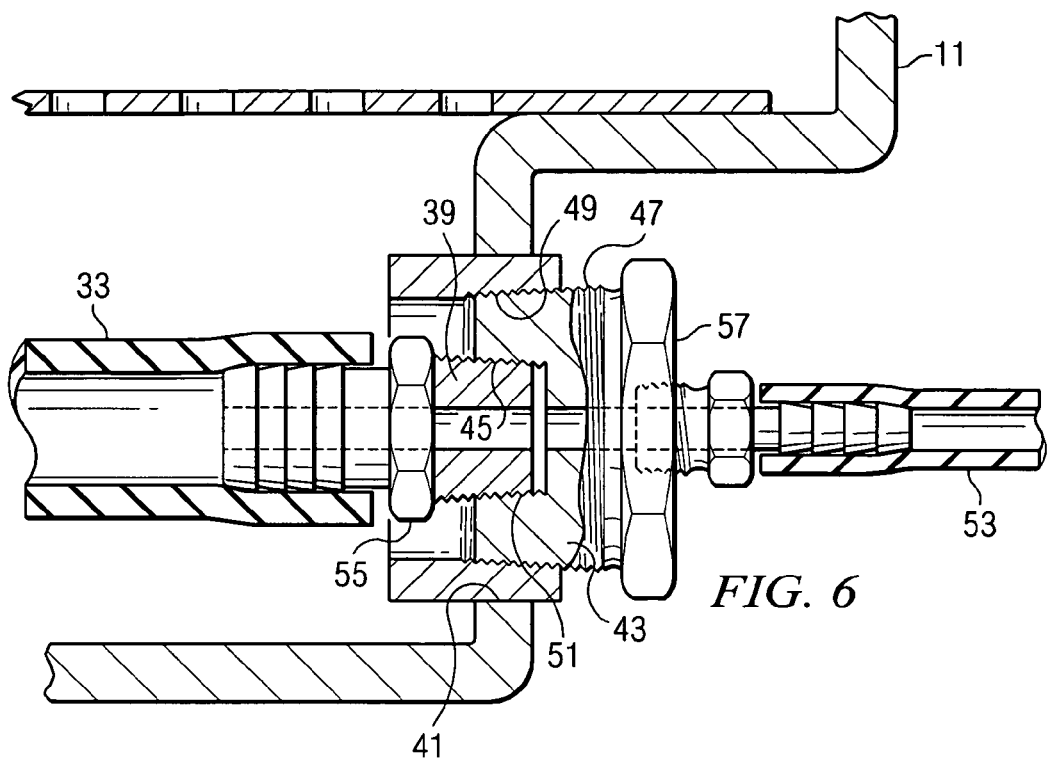
FIG. 6 is a detail view of a portion of the tank sidewall showing the method of connecting an oxygen hose with the aerator hose used in the bottom of the tank.

Turning to FIG. 6, there is shown an aeration line 33 formed of soaker hose type material. The aeration line 33 has an externally threaded end fitting 39. Each line is connected to a sidewall opening 41 of the tank body 11 by means of a double threaded nut 43. The double threaded nut 43 has an inner threaded surface 45 and an outer threaded surface 47. As can be seen in FIG. 6, the outer threaded surface 47 is threadedly engaged within mating threads 49. The inner threaded surface 45 matingly engages the externally threaded surface 51 of the hose end fitting 39. Both the hose end fitting 39 and the oxygen supply hose 53 terminates in a nut element, 55, 57, respectively, to facilitate turning by either hand or with a wrench.

The operation of the improved transport system of the invention will now be briefly described. The molded transport tank is formed, for example by a rotomolding process, as previously described. The aeration lines are placed in the interior floor of the tank and secured to the tank sidewall by means of the previously described double threaded nut 43. In a typical maintenance operation, the aeration lines 33, 35 can be accessed for servicing by simply turning the nut element (57 in FIG. 6) which causes the double threaded nut 43 to back out of the threads 49 provided in the opening 41 in the tank sidewall. While the hose 33 also rotates with the nut 43, the positioning of the hose 33 is not critical since the entire surface is formed of a porous material which distributes the oxygen evenly in use. Once the threaded surfaces 47, 49 break free, the soaker hose 33 can be removed from its respective groove in the tank floor by simply pulling the soaker hose from the tank interior to the exterior thereof, as viewed in FIG. 6. This action exposes the aeration line 33 on the exterior of the tank so that it can be repaired or replaced.

An invention has been provided with several advantages. The tank of the invention is lightweight and durable since it is formed in one piece in a rotomolding operation. Because the tank is molded from plastic, the top surface can easily be provided with anti-skid surface. The tank body can also be provided with a plurality of external strap depressions for receiving transport straps. The interior floor of the tank is provided with alternating ribs and grooves with the aeration lines being placed within the grooves. A perforated plate prevents the fish contained within the tank interior from contacting or damaging the aeration lines. The aeration lines can be quickly and easily removed for repair or replacement by means of a special threaded connection in the tanks sidewall.

While the invention has been shown in only one of its forms, it is not thus limited but is susceptible to various changes and modifications without departing from the spirit thereof.

What is claimed is:

1. A transport tank for live haul transport of aquatic life, the tank comprising:
   a tank body formed of molded plastic, the tank having a top, a bottom, opposing sidewalls, a length, a width, and an interior floor, the interior floor being formed with alternating ribs and grooves running longitudinally parallel to the length thereof;
   a plurality of aeration lines running along at least a part of the length of at least selected ones of the grooves in the interior floor;
   a perforated floor plate located atop the interior floor, the plate being arranged to cover at least that portion of the interior floor containing aeration lines within the alternating grooves;
   wherein each aeration line has an externally threaded end fitting, and wherein each line is connected to a sidewall opening of the tank body by means of a double threaded nut having inner and outer threaded surfaces, the outer threaded surface being threadedly engaged within mating threads provided in the sidewall opening, the inner threaded surface matingly engaging the externally threaded surface of the aeration line end fitting, whereby the aeration line can be removed from the tank groove by unthreading the double threaded nut from outside the tank and by then pulling the aeration line longitudinally out of the tank groove.

2. The tank of claim 1, wherein the aeration line is a soaker hose.

3. The tank of claim 2, wherein the tank body is rotomolded as a single piece.

4. The tank of claim 1, wherein the aeration lines running along at least a part of the length of at least selected ones of the grooves in the interior floor are connected to both a source of pure oxygen and to a blower fan source.

5. The tank of claim 1, wherein at least the top of the molded tank body is provided with an anti-skid surface.

6. The tank of claim 1, wherein the molded tank body is formed with a plurality of external strap depressions for receiving transport straps.

* * * * *